Patented Jan. 6, 1931

1,787,425

UNITED STATES PATENT OFFICE

ALFRED BOOTHE CALLAGHAN, OF NEW YORK, N. Y., ASSIGNOR TO CALTEX COMPANY, INC., OF NEW YORK, N. Y., A CORPORATION OF NEW YORK

COATING COMPOSITION

No Drawing. Application filed February 11, 1921. Serial No. 444,231.

This invention relates to a novel coating composition of matter having an infinite variety of uses particularly adapted for and constituting an excellent mural decorating substance as well as an interior and exterior finishing or protecting surface, it being an object of this invention to provide a durable composition capable of a wide range of uses as indicated, which will have such characteristics of durability, hardness, and adhesiveness that the same may be used, for example, as a combined plaster and paint which may be applied directly to either a rough or smooth foundation surface and when applied will firmly adhere thereto and have any desired texture finish.

Further objects of the invention are to provide a composition of the character indicated which may be suitably and highly colored, if desired, and at the same time form a particularly hard and durable finishing surface. Moreover, the invention contemplates the use therewith of a suitable waterproofing constituent, if desired.

Further objects of the invention are to construct a composition of matter as indicated in such a manner as to be easily manufactured, transported, for example, in a compact powdered form and easily applied to any particular surface by mixing the powdered form of the composition with a suitable fluid, as ordinary hot water, which after application, will evaporate and leave the composition intimately adhering to the surface to which it has been applied.

Moreover, this invention provides a plastic wall composition so constituted as may be applied, for example, directly to a scratch or second rough coat of plaster, eliminating the necessity of a hard finish of white plaster as well as the usual coatings of paint heretofore found necessary in order to form a proper foundation for the finishing surface paint which can be applied and will adhere to the surface of the plaster and at the same time give the desired decorative effect. In this connection the compostion of matter provided hereby may be very effectively applied to renovate an old work where a uniform finish of a particular texture, color, or effect over a previous or new surface or mixture of the two is desired, the body and texture of the improved composition being such as to render the previous condition of the surface totally indiscernible.

The present invention also contemplates a composition of materials which has a sufficient body hardness, durability and binding quality as to form an excellent foundation surface which may be colored by a separate application of paint or other coloring substance. Moreover, the compostion may be made sufficiently thick and colored or uncolored and waterproofed, if desired, to produce desirable relief and intaglio effects.

In carrying the present invention into practice there is provided a powdered composition of matter constituting the essential features of the invention to be later suitably mixed with water or other fugitive substance whereby the composition may be applied to a surface. In forming the composition there is provided a ground or hardening substance, a body material which may be made more or less plastic or pliable, a desirable binder or binding material, together with means to aid drying of the material after application, and a substance, if desired, which will aid in the smooth spreading and easy application of the composition of matter when mixed with the water and applied to the surface. In addition, it is understood, that a coloring pigment or agent may be employed and a suitable oil ingredient may be also used, if desired to render the composition, after application, specifically waterproof.

It is to be understood that the material chosen to constitute the more essential separate constituents of the improved composition of matter may be chosen from a wide range of substances but I have found that a suitable ground and hardening material, the durability and hardness of the improved composition being one of the primary characteristics, is mica, and the proportion of mica to the other substances herein referred to will be varied according to the degree of hardness desired, it being necessary to avoid brittleness by the employment of too much ground or hardening material on the one hand, and softness or a less durable substance by the employment of too little a hardening constituent of the composition. A suitable plastic and pliable body material for the improved composition is also provided to render the composition less transparent by forming a body for coloring or pigment material and to render the composition more plastic and workable and more coherent during working. This body material comprises ordinary clay, the composition of which may vary and therefore the proportion employed may likewise be varied accordingly, the proportion thereof having generally the effect of giving a body substance to the composition and rendering it plastic, and which, when used with a suitable amount of hardening material, will so intermix as to form an unusually hard and durable foundation for the improved resulting composition of matter. It has been found that a suitable binding agent for the composition consists in casein although it is to be understood that a wide variety of binding materials may be used in lieu thereof. If casein is employed it is ground very fine, and mixed therewith is a suitable deodorant such as wintergreen or the like. A suitable drying agent to facilitate application of the powder when mixed with the water consists in a small proportion of alum, and to aid in spreading, a relatively small proportion of cream of tartar has been very satisfactorily employed. It is to be understood that a coloring pigment or coloring agent may be also mixed therewith and that a waterproofing substance may be either mixed with the powdered composition or mixed with the fluid in which the powder is rendered plastic.

The proportions of ingredients of the composition of matter constituting this invention may vary widely and may be determined by the particular application to which the composition is to be applied. However, it has been found that the following proportions, finely powdered and well mixed have given in actual practice, excellent results:

|  | Parts (in volume) |
|---|---|
| Mica | 49 |
| Clay | 30 |
| Specially prepared casein | 18 |
| Alum | 2 |
| Cream of tartar | 1 |
| Total | 100 |

In applying the composition to a surface to be coated therewith the composition of matter, in smooth powdered form, is delivered to the place of application and there mixed with hot water in such proportions as to give the desired constituency to the mixture, dependent upon the texture, color, or body effect to be obtained on the surface being finished. The plastic mixture may be made sufficiently thin as to be capable of application with an ordinary brush or in certain instances, as will be readily understood, it may be made merely plastic and applied with a trowel or other similar implement. It is to be understood that when in a plastic condition while on the surface and before the substance is dry, various decorative designs can be made, such as simulations of tiling, figuring, relief, intaglio, and the like.

Having thus described my invention, what I desire to claim for Letters Patent is:

1. A coating composition including mica, clay, casein, a coloring agent, alum, and cream of tartar.

2. A coating composition including mica, clay, casein, alum, and cream of tartar.

3. A coating composition including mica 49 parts (by volume), clay 30 parts, casein 18 parts, alum two parts, and cream of tartar 1 part.

In testimony whereof, I affix my signature.

ALFRED BOOTHE CALLAGHAN.